United States Patent
Zhu et al.

(10) Patent No.: US 8,348,491 B2
(45) Date of Patent: Jan. 8, 2013

(54) LIGHT GUIDE PLATES AND BACKLIGHT MODULE

(75) Inventors: Jun Zhu, Beijing (CN); He Zhang, Beijing (CN); Yan Zhao, Beijing (CN); Guo-Fan Jin, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1 day.

(21) Appl. No.: 13/270,244

(22) Filed: Oct. 11, 2011

(65) Prior Publication Data

US 2012/0026722 A1 Feb. 2, 2012

Related U.S. Application Data

(63) Continuation of application No. 12/485,267, filed on Jun. 16, 2009, now Pat. No. 8,057,056.

(30) Foreign Application Priority Data

Aug. 9, 2008 (CN) .......................... 2008 1 0142287

(51) Int. Cl.
*F21V 7/04* (2006.01)

(52) U.S. Cl. ...................................... 362/625; 362/623

(58) Field of Classification Search ........ 362/97.1–97.4, 362/223, 327, 330, 346, 348, 558, 561, 600–62; 349/56, 57, 61–65, 67–70
See application file for complete search history.

(56) References Cited

U.S. PATENT DOCUMENTS

| | | | | |
|---|---|---|---|---|
| 5,775,791 A * | 7/1998 | Yoshikawa et al. | | 362/625 |
| 6,746,129 B2 * | 6/2004 | Ohkawa | | 362/625 |
| 7,068,332 B2 * | 6/2006 | Liu et al. | | 349/64 |
| 7,455,416 B2 * | 11/2008 | Chen | | 362/85 |
| 7,455,425 B2 * | 11/2008 | Inoue et al. | | 362/241 |
| 7,455,452 B2 * | 11/2008 | Seo | | 374/171 |
| 7,525,531 B2 * | 4/2009 | Ogiwara et al. | | 345/103 |
| 2003/0156238 A1 * | 8/2003 | Hiraishi et al. | | 349/112 |
| 2006/0056166 A1 * | 3/2006 | Yeo et al. | | 362/19 |
| 2006/0120112 A1 * | 6/2006 | Lin et al. | | 362/626 |
| 2007/0041216 A1 * | 2/2007 | Yue | | 362/620 |
| 2007/0070616 A1 * | 3/2007 | Segawa | | 362/97 |
| 2008/0285308 A1 * | 11/2008 | Clary et al. | | 362/619 |
| 2009/0003002 A1 | 1/2009 | Sato | | |
| 2010/0002169 A1 * | 1/2010 | Kuramitsu et al. | | 349/65 |

FOREIGN PATENT DOCUMENTS

| | | | |
|---|---|---|---|
| JP | 09330610 A | * | 12/1997 |
| JP | 2002-245830 | | 8/2002 |
| JP | 2007-26702 | | 2/2007 |
| JP | 2008-27886 | | 2/2008 |

* cited by examiner

*Primary Examiner* — Hargobind S Sawhney
(74) *Attorney, Agent, or Firm* — Altis Law Group, Inc.

(57) ABSTRACT

A light guide plate includes a body having a bottom surface and a light output surface opposite to the bottom surface. A scattering structure is formed on the bottom surface. The scattering structure includes a number of scattering dots located in the form of a number of concentric shapes around the center. The scattering dots adjacent to the center are arranged in a plurality of concentric circles. The scattering dots adjacent to the edge are arranged in a number of concentric quadrilaterals having a shape substantially corresponding to a shape of the light guide plate. A backlight module using the light guide plate is also provided.

20 Claims, 2 Drawing Sheets

LIGHT GUIDE PLATES AND BACKLIGHT MODULE

RELATED APPLICATIONS

This application is a continuation application of U.S. patent application Ser. No. 12/485,267, filed Jun. 16, 2009, entitled, "LIGHT GUIDE PLATES AND BACKLIGHT MODULE," which claims all benefits accruing under 35 U.S.C. §119 from China Patent Application No. 200810142287.6, filed on Aug. 9, 2008 in the China Intellectual Property Office.

BACKGROUND

1. Technical Field

The present disclosure relates to a light guide plates and a backlight modules and, particularly, to a light guide plate for direct-type backlight module and a direct-type backlight module.

2. Description of Related Art

Currently, because liquid crystal displays (LCDs) are thin, lightweight, long lasting, and consume little power, they are extensively used in a variety of electronic devices. However, liquid crystal displays are not self-luminescent, therefore, backlight modules are typically required. Generally, backlight modules can be categorized as either direct-type backlight modules or edge-type backlight modules. Because direct-type backlight modules can provide high illumination in comparison with edge-type backlight modules, direct-type backlight modules are more widely employed in numerous applications.

A light guide plate for direct-type backlight module according to a related art includes a top light output surface, a bottom surface opposite to the light output surface and at least one side connecting the bottom surface and the top light output surface. At least one of the bottom surface and the top light output surface includes a center and a plurality of scattering dots. The scattering dots are arranged at random. However, a light source, for example, a point light source, usually emits column-shape lights and the light guide plate is in square or rectangle form. Therefore, the light output from the light guide plate is not uniform, thereby reduces the uniformity of illumination of the direct-type backlight module.

What is needed, therefore, is to provide a light guide plate and a direct-type backlight module using the same that have improved uniformity of illumination.

BRIEF DESCRIPTION OF THE DRAWINGS

Many aspects of the present light guide plate and direct-type backlight module can be better understood with reference to the following drawings. The components in the drawings are not necessarily drawn to scale, the emphasis instead being placed upon clearly illustrating the principles of the present light guide plate and direct-type backlight module.

Figure 1:
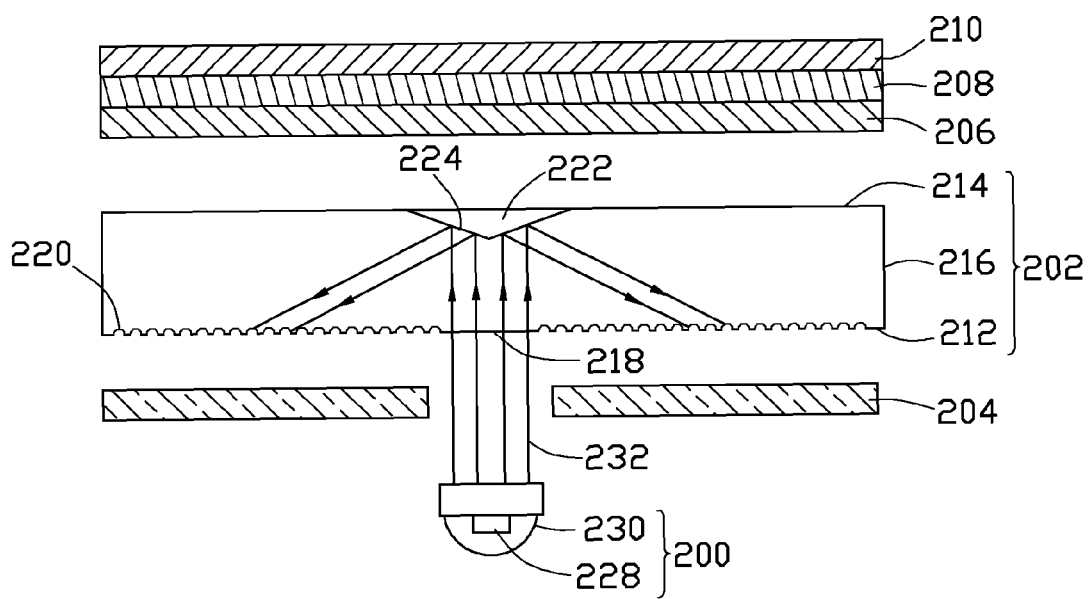
FIG. 1 is an exploded, cross-sectional view of a direct-type backlight module in accordance with a present embodiment of the present disclosure.

Corresponding reference characters indicate corresponding parts throughout the several views. The exemplifications set out herein illustrate at least one embodiment of the present light guide plate and direct-type backlight module, in at least one form, and such exemplifications are not to be construed as limiting the scope of the disclosure in any manner.

DETAILED DESCRIPTION

References will now be made to the drawings to describe, in detail, various embodiments of the present light guide plate and direct-type backlight module.

Referring to FIG. 1, a direct-type backlight module 20 according to a present embodiment is shown. The backlight module 20 includes a light source 200, a light guide plate 202, a reflective plate 204, a microprism plate 206, a polarization plate 208 and a diffusing plate 210.

The light guide plate 202 includes a body having a bottom surface 212, a light output surface 214 opposite to the bottom surface 212, and at least one lateral side 216. The bottom surface 212 has a center 218. The light source 200 is located adjacent to the bottom surface 212 and aligned with the center 218. The reflective plate 204 is located between the light source 200 and the bottom surface 212 of the light guide plate 202. The microprism plate 206, the polarization plate 208 and the diffusing plate 210 are located in sequence from bottom to top above the light output surface 214 of the light guide plate 202.

The light source 200 includes a luminescent device 228 and a focusing device 230. The luminescent device 228 is a point light source such as fluorescent lamp or light-emitting diode (LED). In one embodiment, the luminescent device 228 is a monochromatic LED, and the focusing device 230 includes an aspherical lens and an aspherical mirror. The light beam 232 radiated from the light source 200 can almost vertically strike the bottom surface 212 of the light guide plate 202. In one embodiment, a diameter of the light beam 232 ranges from about 6 millimeters to about 8 millimeters.

The light guide plate 202 can be a transparent plate in a round, square, rectangle, polygon or other shape. The light guide plate 202 can be made of plastic, polymethyl methacrylate (PMMA) or glass. The thickness of the guide plate 202 is arbitrary, and can be selected according to need. In one embodiment, the light guide plate 202 is a square PMMA plate and the side length of the light guide plate 202 is about 50 millimeters.

Figure 2:
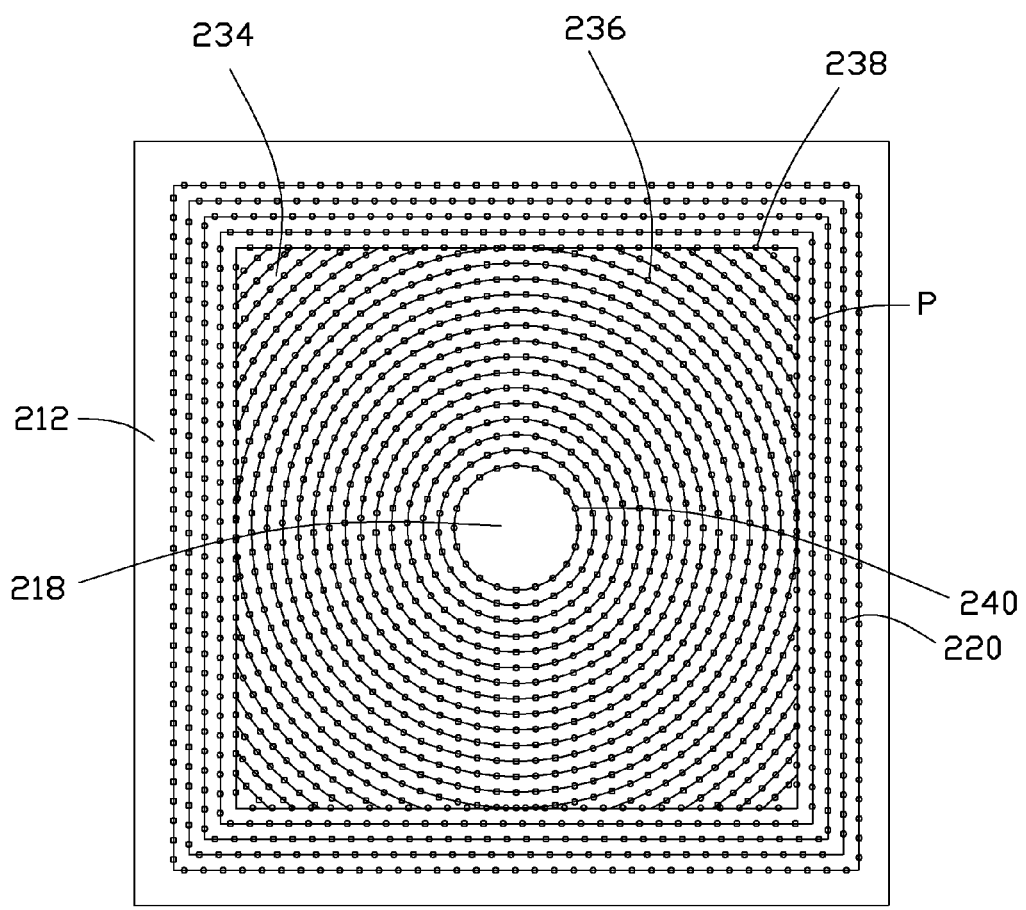
FIG. 2 is a schematic bottom view of the light guide plate of FIG. 1.

Referring to FIG. 2, the light guide plate 202 includes a scattering structure P formed on the bottom surface 212. The scattering structure P includes a plurality of scattering dots 220 located on the bottom surface 212 of the light guide plate 202. The scattering dots 220 are arranged in the form of a plurality of concentric shapes about the center 218. The shapes can be round, ellipsoidal or polygonal or combinations thereof. The adjacent two shapes are located equidistantly and a distance between the adjacent two shapes ranges from about 0.5 millimeter to about 2 millimeters. The density of the scattering dots 220 can increase further away from the center 218 to the sides so as to maintain a uniform light output as the intensity of light reduces away from the center 218 to the sides. The scattering dots 220 on the same shape are located uniformly. A distance between the adjacent two scattering dots 220 on the same shape ranges from about 0.1 millimeters to about 1 millimeter. The density of the scattering dots 220 on each shape can increase further away from the center 218. The scattering dots 220 can be protruding, concave or a combination thereof. The shape of the scattering dots 220 can be triangular, square, rhombic, round or a combination thereof. Effective diameters of the scattering dots 220 range from about 0.1 millimeters to about 0.5 millimeters. The scattering dots 220 can be made of ink, Ti-related materials or Si compound. The exposed surfaces of the scattering dots 220 can be coated with highly reflective material (not shown). The scattering structure P is configured to scatter incident light propagating within the light guide plate 202, and thereby uniformly transmit the light to the light output surface 214 of the light guide plate 202.

Because the light beam 232 radiated from the light source 200 is usually column-shaped, the scattering dots 220 adjacent to the center 218 can be arranged in the form of a plurality of concentric circles around the center 218. The scattering dots 220 adjacent to the edge of the bottom surface 212 can be arranged in the form of a plurality of concentric polygons around the center 218. The shape of the polygons can be substantially the same as the shape of the light guide plate 202. The ratio of the number of circles to the number of polygons can be less than 20:1. The scattering dots 220 in an area 234, between the most outside of concentric circle and the most inside of concentric polygon, are arranged in a plurality of circular arcs. In one embodiment, the light guide plate 202 is a square plate with a side length of 50 millimeters. There are 15 circles and 5 polygons. The diameter of the first circle 240 adjacent to the center 218 can be larger than 8 millimeters so that the light beam 232 can directly enter the light guide plate 202. The last circle 236 is tangential to the first polygon 238. A distance between adjacent two shapes is about 1 millimeter. A distance between the adjacent two scattering dots 220 on the same shape is about 0.6 millimeters. The scattering dots 220 are half-ball concave dents in the light guide plate. A diameter of the half-ball concave is about 0.3 millimeters.

In other embodiments, the light guide plate 202 can include a scattering structure formed on the light output surface 214 of the light guide plate 202, and the scattering structure includes a plurality of scattering dots arranged in the form of a plurality of concentric shapes about the center of the light output surface 214. Alternatively, the light guide plate 202 can include a first scattering structure formed on the bottom surface 212 and a second scattering structure formed on the light output surface 214 of the light guide plate 202. When the scattering structure P is formed at both the bottom surface 212 and the light output surface 214, the light beam between the bottom surface 212 and the light output surface 214 can be reflected many times by the scattering dots 220, thus the uniformity of light output can be further improved.

In one embodiment, the light guide plate 202 further includes a reflector 222 located opposite to the center 218. The reflector 222 can be a protrusion protruding from the light output surface 214 to the inside of the light guide plate 202. The protrusion can be generally hemispherical or conical. The reflector 222 has a reflective surface 224. The reflective surface 224 of the reflector 222 is configured to reflect part of the light from the corresponding light source 200 to the inside of the light guide plate 202. The light reflected into the light guide plate 202 by the reflective surface 224 can be scattered by the scattering dots 220 and get to the light output surface 214 uniformly. Thus, the uniformity of illumination of the backlight module 20 is improved. The reflective surface 224 can be coated with reflective material. The reflective material can be selected according to desired reflective efficiency. The shape of the protrusion is not limited to what is described and illustrated above. Any suitable shapes that allow the reflective surface 224 to redirect light into the light guide plate 202 may be employed.

The light guide plate 202 provided in the disclosure can be used in a backlight module having different structure with the backlight module 20.

The reflective plate 204 is located between the light source 200 and the bottom surface 212 of the light guide plate 202. The shape and the area of the reflective plate 204 are the same with that of the light guide plate 202. The thickness of the reflective plate 204 is arbitrary, and can be selected according to need. Part of the reflective plate 204 opposite to the light source 200 is transparent or hollow so that the light eradiated from the light source 200 can enter the light guide plate 202 directly. In one embodiment, part of the reflective plate 204 opposite to the light source 200 is hollow. The reflective plate 204 further includes a reflective film (not shown) located on the surface of the reflective plate 204 opposite to the light guide plate 202. The light striking on the bottom surface 212 of the light guide plate 202 can be reflected back into the light guide plate 202. Thus, the uniformity of illumination of the backlight module 20 can be improved.

The microprism plate 206, the polarization plate 208 and the diffusing plate 210 are located in sequence from bottom to top above the light output surface 214 of the light guide plate 202. The microprism plate 206 is configured to better focus light along desired paths. The polarization plate 208 is located between the microprism plate 206 and the diffusing plate 210. The polarization plate 208 is configured to polarize and modulate the light passing there through. The diffusing plate 210 is configured to enhance the uniformity of distribution of light that passes from the backlight module 20 to the display panel.

For enhancing reflection efficiency, the bottom surface 212 and lateral side 216 of the scattering dot 220 can be coated with highly reflective material (not shown). In addition, the backlight module 20 can further include an optical film (not shown), such as a brightness enhancement film (BEF) or a light scattering film, located above the light output surface 214. The optical film increases the brightness of a display panel (not shown) of the LCD device.

In the working process of the backlight module 20, the light radiated from the light source 200 is a column-shape light beam 232. The light beam 232 gets through the hollow part of the reflective plate 204 and enters the light guide plate 202. After the light beam 232 arrives at the reflector 222, part of the light gets out of the light guide plate 202 through the light output surface 214. At the same time, the other part of the light is reflected by the reflective surface 224 into the light guide plate 202. The light in the light guide plate 202 is reflected between the output surface 214 and the bottom surface 212 until it emmiated out of the light guide plate 202. Because the scattering dots 220 adjacent to the center 218 are arranged on a plurality of concentric circles around the center 218, the scattering structure P can scatter the column-shape light beam 232 uniformly to the light output surface 214. Because the scattering dots 220 adjacent to the edge of the bottom surface 212 are arranged on a plurality of concentric polygons around the center 218, the scattering structure P can scatter the light to uniformly light a square output surface 214. Thus, the uniformity of illumination of the backlight module 20 can be improved. The uniformity of the backlight module 20 can be greater than 85%. In one embodiment, the uniformity of the backlight module 20 is 90%. The backlight module 20 can be widely employed in Liquid Crystal Displays.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A light guide plate, comprising:
   a quadrilateral body comprising a bottom surface having a center and an edge, and a top surface opposite to the bottom surface;
   circles of a plurality of first scattering dots on the bottom surface, the circles being adjacent to the center of the bottom surface, and each of the circles being concentric around the center of the bottom surface; and
   quadrilaterals of the plurality of first scattering dots on the bottom surface, the quadrilaterals being adjacent to the edge of the bottom surface and outlining the edge of the bottom surface, and each of the quadrilaterals being concentric around the center of the bottom surface.

2. The light guide plate of claim 1, wherein a ratio of a number of circles to a number of quadrilaterals is less than 20:1.

3. The light guide plate of claim 1, wherein a distance between two adjacent of the circles or two adjacent of the quadrilaterals ranges from about 0.5 millimeter to about 2 millimeters.

4. The light guide plate of claim 1, wherein the plurality of first scattering dots on each of the circles and each of the quadrilaterals are spaced uniformly, and a distance between adjacent two of the plurality of first scattering dots on each of the circles and each of the quadrilaterals ranges from about 0.1 millimeter to about 1 millimeter.

5. The light guide plate of claim 1, wherein a density of the plurality of first scattering dots on each of the circles and each of the quadrilaterals increases further away from the center.

6. The light guide plate of claim 1, wherein exposed surfaces of the plurality of first scattering dots are coated with reflective material.

7. The light guide plate of claim 1, wherein an outermost circle is tangential to an innermost quadrilateral.

8. The light guide plate of claim 1, further comprising circular arcs of the plurality of first scattering dots, the circular arcs being located in an area between an outermost circle and an innermost quadrilateral.

9. The light guide plate of claim 1, further comprising patterns of the plurality of first scattering dots on the top surface, each of the patterns being concentric around a center of the top surface.

10. The light guide plate of claim 1, wherein the quadrilateral body defines a reflector located opposite to the center of the bottom surface, wherein the reflector protrudes from the top surface to an inside of the quadrilateral body.

11. A backlight module comprising:
    a quadrilateral light guide plate comprising a bottom surface having a center and an edge, and a light output surface opposite to the bottom surface;
    a light source located adjacent to the center of bottom surface and configured to radiate a column-shaped light beam to vertically strike the bottom surface;
    circles of a plurality of first scattering dots on the bottom surface, the circles being adjacent to the center of the bottom surface, and each of the circles being concentric around the center of the bottom surface; and
    quadrilaterals of the plurality of first scattering dots on the bottom surface, the quadrilaterals being adjacent to the edge of the bottom surface and outlining the edge of the bottom surface, and each of the quadrilaterals being concentric around the center of the bottom surface.

12. The backlight module of claim 11, wherein a ratio of a number of circles to a number of quadrilaterals is less than 20:1.

13. The backlight module of claim 11, wherein a distance between two adjacent of the circles or two adjacent of the quadrilaterals ranges from about 0.5 millimeter to about 2 millimeters.

14. The backlight module of claim 11, wherein the plurality of first scattering dots on each of the circles and each of the quadrilaterals are spaced uniformly, and a distance between adjacent two of the plurality of first scattering dots on each of the circles and each of the quadrilaterals ranges from about 0.1 millimeter to about 1 millimeter.

15. The backlight module of claim 11, wherein an outermost circle is tangential to an innermost quadrilateral.

16. The backlight module of claim 11, the light guide plate further comprises circular arcs of the plurality of first scattering dots, the circular arcs being located in an area between an outermost circle and an innermost quadrilateral.

17. The backlight module of claim 11, further comprising a brightness enhancement film located above the light output surface of the light guide plate.

18. The backlight module of claim 11, further comprising a light scattering film located above the light output surface of the light guide plate.

19. The backlight module of claim 11, further comprising a microprism plate, a polarization plate, and a diffusing plate.

20. A backlight module comprising:
    a polygonal light guide plate comprising a bottom surface and a light output surface opposite to the bottom surface, the light output surface having a center and an edge;
    a light source located adjacent to the center of bottom surface and configured to radiate a column-shaped light beam to vertically strike the bottom surface;
    circles of a plurality of first scattering dots on the bottom surface, the circles being adjacent to the center of the bottom surface, each of the circles being concentric around the center of the bottom surface, and the plurality of first scattering dots on each of the circles is arranged along a single line; and
    polygons of the plurality of first scattering dots on the bottom surface, the polygons being adjacent to the edge of the bottom surface and outlining the edge of the bottom surface, each of the polygons being concentric around the center of the bottom surface, and the plurality of first scattering dots on each of the polygons is arranged along a single line.

* * * * *